United States Patent [19]
Nakano et al.

[11] Patent Number: 5,539,787
[45] Date of Patent: Jul. 23, 1996

[54] CONVERTER FOR CONNECTING MODEM EQUIPMENT OF DISSIMILAR INTERFACE PROTOCOL

[75] Inventors: Takahiko Nakano, Ikoma; Yuuji Nishiwaki, Nara-ken, both of Japan

[73] Assignee: Sharp Kabushiki Kaisha, Osaka, Japan

[21] Appl. No.: 86,134

[22] Filed: Jul. 6, 1993

[30] Foreign Application Priority Data

Jul. 6, 1992 [JP] Japan ................... 4-178508

[51] Int. Cl.⁶ ........................................ H04L 23/00
[52] U.S. Cl. ......................................... 375/377
[58] Field of Search ........................ 375/7, 8, 9, 36, 375/121, 219, 220, 222, 223, 257, 377; 395/325; 370/85.13, 94, 110.1

[56] References Cited

U.S. PATENT DOCUMENTS

| | | | |
|---|---|---|---|
| 4,603,320 | 7/1986 | Farago | 375/121 |
| 4,884,287 | 11/1989 | Jones et al. | 375/121 |
| 5,134,648 | 7/1992 | Hochfield et al. | 379/93 |
| 5,179,586 | 1/1993 | Lee | 375/377 |
| 5,202,884 | 4/1993 | Close et al. | 375/377 |
| 5,257,289 | 10/1993 | Jopson | 375/121 |
| 5,260,555 | 11/1993 | Sakamoto | 235/492 |
| 5,267,218 | 11/1993 | Elbert | 365/226 |

*Primary Examiner*—Stephen Chin
*Assistant Examiner*—Don Vo

[57] ABSTRACT

A converter which is connected to a modulation/demodulation equipment having a first interface and to a terminal equipment having a second interface is disclosed. The converter includes a first connector for electrically connecting the converter to the modulation/demodulation equipment; a second connector for electrically connecting the converter to the terminal equipment; a signal converting circuit connected to the first connector and the second connector, for converting a signal input from the first connector into a signal which follows the second interface, the converted signal being output to the second connector, and for converting a signal input from the second connector into a signal which follows the first interface, the converted signal being output to the first connector; and a power supply circuit for supplying power to the modulation/demodulation equipment via the first connector.

11 Claims, 5 Drawing Sheets

CONVERTER FOR CONNECTING MODEM EQUIPMENT OF DISSIMILAR INTERFACE PROTOCOL

BACKGROUND OF THE INVENTION

1. Field of the Invention

The present invention relates to a converter for connecting a modulation/demodulation equipment having a first interface type and a modulation/demodulation equipment having a second interface type to each other.

2. Description of the Background Art

A modulation/demodulation equipment such as a MODEM is connected to a terminal equipment such as a personal computer or the like, via a specific interface. The term "interface" used herein indicates physical and logical rules defined for the communications between two or more devices. More specifically, the term "interface" is defined as the rules related to a communication protocol, timings for inputting/outputting signals, the shape and pin arrangement of the connectors, and the like. An interface is selectively used depending on the conditions under which the modulation/demodulation equipment and the terminal equipment are used. For example, in the case where the modulation/demodulation equipment is of a card type, an interface dedicated to a card-type equipment is adopted in order to realize portability of the modulation/demodulation equipment. Such a card-type modulation/demodulation equipment has no physical space for a large-capacity power supply. Therefore, to the card-type modulation/demodulation equipment, power is supplied from the terminal equipment via the interface dedicated to a card-type equipment.

As described above, the card-type modulation/demodulation equipment has an interface dedicated to a card-type equipment. Therefore, it is impossible to directly connect the card-type modulation/demodulation equipment to a terminal equipment having a conventional versatile interface. The reason is that signals cannot be transmitted and received between the devices having different interfaces, because the different interfaces define different rules related to the types of signals, the timings for inputting/outputting signals, and the like. Moreover, the card-type modulation/demodulation equipment has no physical space for providing a connector having the versatile interface and a power supply.

Therefore, it is impossible to directly substitute the card-type modulation/demodulation equipment for the conventional modulation/demodulation equipment having the versatile interface and having a power supply. As a result, according to the prior art, the card-type modulation/demodulation equipment cannot be connected to terminal equipment having the versatile interface.

SUMMARY OF THE INVENTION

The converter of this invention which is connected to modulation/demodulation equipment having a first interface and to a terminal equipment following a second interface, includes: a first connector for electrically connecting the converter to the modulation/demodulation equipment; a second connector for electrically connecting the converter to the terminal equipment; a signal converter connected to the first connector and the second connector, for converting a signal input from the first connector into a signal which follows the second interface, the converted signal being output to the second connector, and for converting a signal input from the second connector into a signal which is compatible with the first interface, the converted signal being output to the first connector; and a power supply for supplying power to the modulation/demodulation equipment via the first connector.

The converter according to the invention is connected to a modulation/demodulation equipment via a connector dedicated to the modulation/demodulation equipment and connected to a terminal equipment via a connector dedicated to the terminal equipment. Accordingly, the modulation/demodulation equipment and the terminal equipment are connected to each other to be compatible with the respective interfaces. In a case where it is necessary to convert signals between the modulation/demodulation equipment and the terminal equipment, the signals are converted by the signal converting circuit. Moreover, power is supplied from the power supplying circuit to the modulation/demodulation equipment via the connector dedicated to the modulation/demodulation equipment.

Thus, the invention described herein makes possible the advantages of (1) providing a converter for connecting a modulation/demodulation equipment and a terminal equipment following different interfaces to each other, and more specifically (2) providing a converter for connecting a card-type modulation/demodulation equipment following an interface dedicated to a card-type equipment to a terminal equipment following a versatile interface.

For the scope of applicability of the present invention will become apparent from the detailed description hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

These and other advantages of the present invention will become apparent to those skilled in the art upon reading and understanding the following detailed description with reference to the accompanying figures which are given by way of illustration only and thus are not limitative of the present invention and wherein.

DESCRIPTION OF THE PREFERRED EMBODIMENTS

Hereinafter, the invention will be described by way of examples.

EXAMPLE 1

Figure 1:
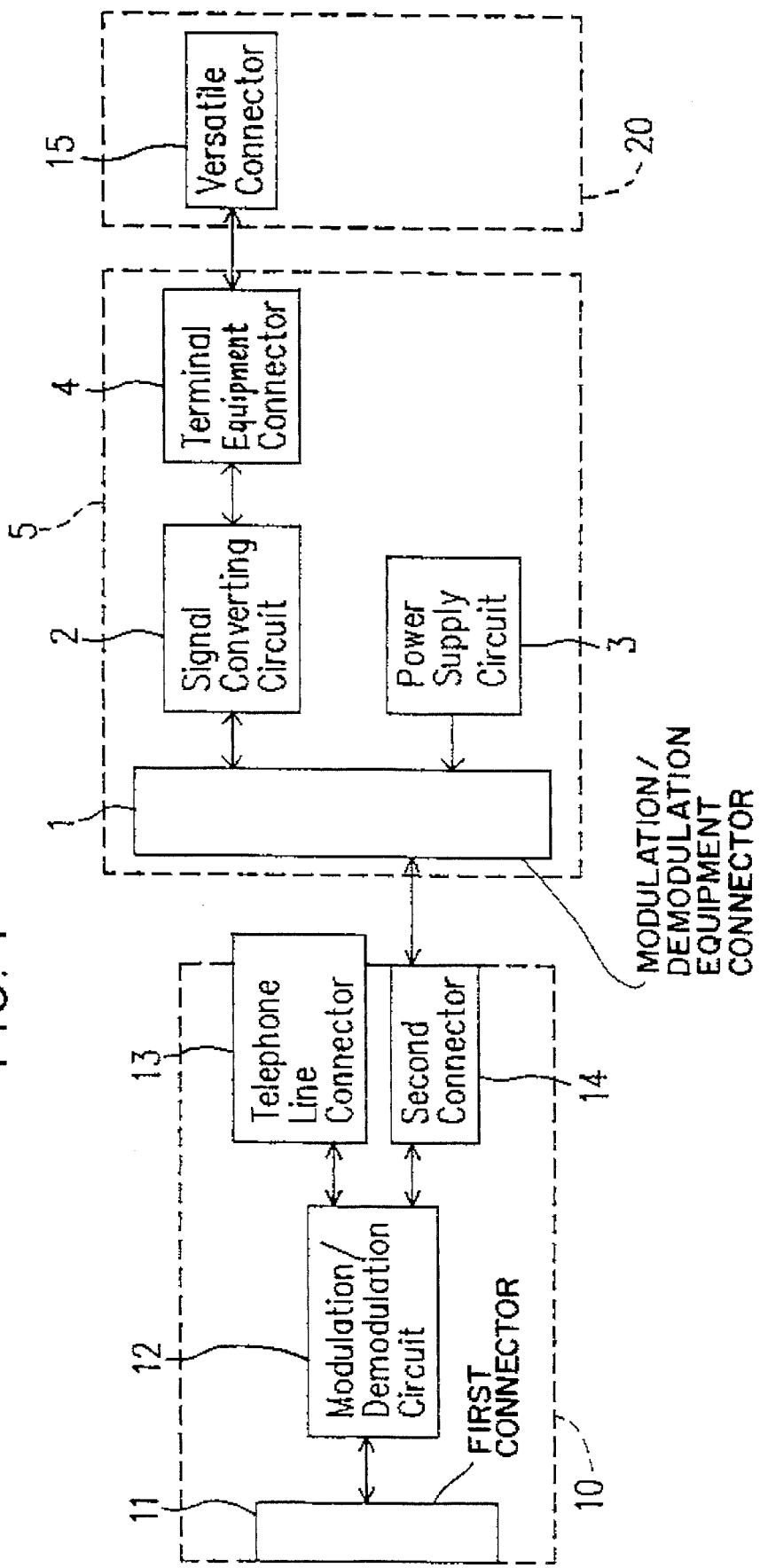
FIG. 1 is a diagram showing the structure of a converter according to the invention.

FIG. 1 shows the structure of a converter according to the invention together with a modulation/demodulation equipment and a terminal equipment which are connected to the converter.

The modulation/demodulation equipment 10 is of a card type. A card-type modulation/demodulation equipment has various dimensions, for example, about 54.0 mm (length)× 85.6 mm (width)×5.0 mm (height). The modulation/demodulation equipment is usually called a MODEM, and connected to a terminal equipment for communicating with other terminal devices located at remote places via a telephone line. Recently, as the size of a terminal equipment is reduced, a card-type modulation/demodulation equipment with superior portability has been developed. According to the conventional system, it is necessary to provide an additional connector dedicated to a card-type equipment to the terminal equipment, and to insert the card-type modulation/demodulation equipment into the connector, in order to connect the card-type modulation/demodulation equipment to the terminal equipment. According to the converter of the present invention, the card-type modulation/demodulation equipment can be connected to the terminal equipment without needing an additional connector dedicated to a card-type equipment to the terminal equipment.

Referring to FIG. 1, the modulation/demodulation equipment 10 includes a telephone line connector 13 for the connection to a telephone line, a first connector 11 and a second connector 14 for connection to other devices, and a modulation/demodulation circuit 12. The modulation/demodulation circuit 12 is electrically connected to the first connector 11, the second connector 14 and the telephone line connector 13, respectively.

The telephone line connector 13 receives an analog signal having a telephone-line signal band (300 Hz–3400 Hz), and transfers the analog signal to the modulation/demodulation circuit 12. The modulation/demodulation circuit 12 converts the analog signal into a digital signal. The converted digital signal is supplied to the first connector 11 and the second connector 14.

The first connector 11 meets the JEIDA (Japan Electronic Industry Development Association) standard version 4.1 (PCMCIA (Personal Computer Memory Card International Association) release 2.0) which is the interface dedicated to a card-type equipment. The second connector 14 meets the RS-232C standard which is widely used as the externally connecting interface of a computer, regarding the electrical connections and the timings for receiving and transmitting signals. However, the second connector 14 does not meet the standard of the RS-232C, in regards to the physical connector shape or the operating voltage range. The reason why the second connector 14 does not meet these particular standards of the RS-232C is that it is very difficult to provide a connector having a shape corresponding with the RS-232C standard in the card-type modulation/demodulation equipment 10, because of the thickness restriction of the card-type modulation/demodulation equipment 10. Hereinafter, for convenience in this specification, the second connector 14 is assumed to meet the standard of "RS-232C'".

A terminal equipment 20 is used to communicate with another terminal equipment (not shown) via the modulation/demodulation equipment 10. The terminal equipment 20 has a versatile connector 15. The versatile connector 15 meets the RS-232C standard. For example, the versatile connector 15 may be an insert-type connector having 25 pins, and generally called a 25-pin D-SUB connector.

A converter 5 includes at least two connectors for the connections with external devices. One is a modulation/demodulation equipment connector 1 for connection with the modulation/demodulation equipment 10. Another is a terminal equipment connector 4 for connection with the terminal equipment 20. The converter 5 further includes a signal converting circuit 2 and a power supply circuit 3. The signal converting circuit 2 is connected to the modulation/demodulation equipment connector 1 and the terminal equipment connector 4. A signal which is input from the modulation/demodulation equipment connector 1 is converted into a signal for the terminal equipment 20, and the converted signal is output to the terminal equipment connector 4. A signal which is input from the terminal equipment connector 4 is converted into a signal for the modulation/demodulation equipment 10, and the converted signal is output to the modulation/demodulation equipment connector 1. The power supply circuit 3 supplies power to the modulation/demodulation equipment 10 via the modulation/demodulation equipment connector 1.

The modulation/demodulation equipment connector 1 meets the same standard as that for the second connector 14 of the modulation/demodulation equipment 10. That is, the modulation/demodulation equipment connector 1 meets the RS-232C standard. The terminal equipment connector 4 meets the same standard as that for the versatile connector 15 of the terminal equipment 20. That is, the terminal equipment connector 4 meets the RS-232C standard. The modulation/demodulation equipment connector 1 is electrically connected to the second connector 14 of the modulation/demodulation equipment 10. The terminal equipment connector 4 is electrically connected to the versatile connector 15 of the terminal equipment 20.

Figure 2:
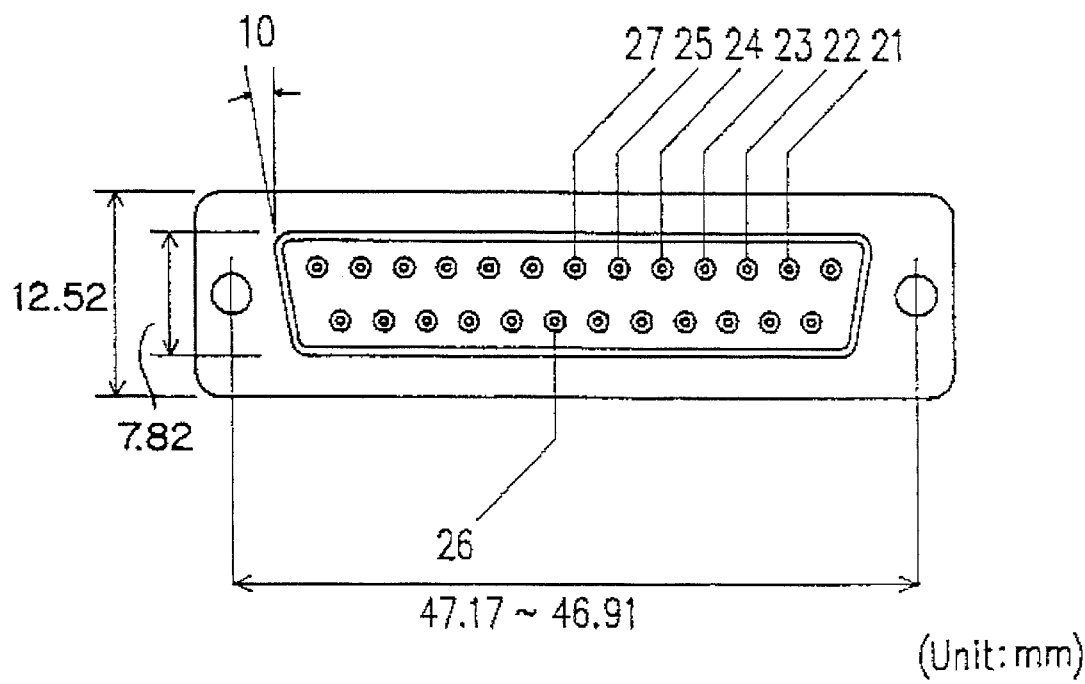
FIG. 2 is a view showing the shape and the pin arrangement of the connector which can be used as a terminal equipment connector of the converter shown in FIG. 1.

FIG. 2 shows the shape and the pin arrangement of the 25-pin D-SUB connector which can be used as the terminal equipment connector 4. In FIG. 2, pins 21 and 22 are used to transmit and receive signals indicative of send data (SD) and receive data (RD), respectively. Pins 23 to 27 are used to transmit and receive signals indicative of request-to-send (RS), clear-to-send (CS), data-set-ready (DR), data-terminal-ready (ER), and signal-ground (SG), respectively.

Figure 3:
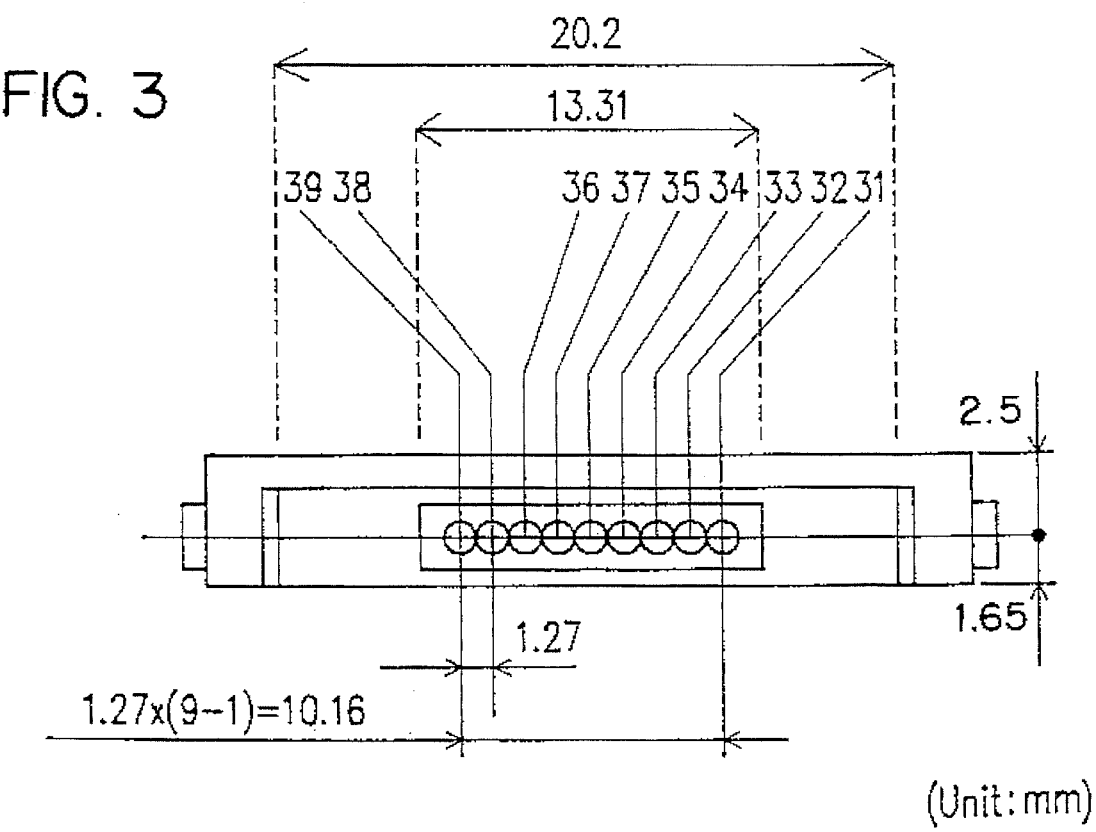
FIG. 3 is a view showing the shape and the pin arrangement of the connector which can be used as a modulation/demodulation equipment connector of the converter shown in FIG. 1.

FIG. 3 shows the shape and the pin arrangement of a connector which can be used as the modulation/demodulation equipment connector 1. For the reasons as described above, the shape of the connector is different from that of the 25-pin D-SUB connector. However, the pin arrangement of the connector is substantially the same as that of the 25-pin D-SUB connector. In FIG. 3, pins 31 and 32 are used to transmit and receive signals indicative of send data (SD) and receive data (RD), respectively. Pins 33 to 37 are used to transmit and receive signals indicative of request-to-send (RS), clear-to-send (CS), data-set-ready (DR), data-terminal-ready (ER), and signal-ground (SG), respectively. Pins 38 and 39 are used for supplying power (VCC) and for grounding (GND).

The signal which is input into the modulation/demodulation equipment connector 1 is sent to the signal converting circuit 2. The signal converting circuit 2 converts the signal output from the second connector 14 of the modulation/demodulation equipment 10 into a signal having the characteristics capable of being input into the terminal equipment 20. In this case, the characteristics of both the signals are common excluding the voltage levels. Therefore, the signal converting circuit 2 converts the voltage level of the signal which is input into the modulation/demodulation equipment connector 1 into the voltage level of a signal which can be input into the terminal equipment 20. Thereafter, the signal having the converted voltage level is output to the terminal equipment connector 4. Such a conversion of the voltage level can be realized by a driver/receiver IC for RS-232C. For example, for the signal converting circuit 2, "SN75188" which is commercially available from TEXAS INSTRUMENTS LTD. can be used.

In addition, the power supply circuit 3 supplies power to the modulation/demodulation equipment 10 via the modulation/demodulation equipment connector 1. More specifically, in the case where the modulation/demodulation equipment connector 1 is a connector as shown in FIG. 3, a voltage of 5 V is supplied to the pin 38 of the modulation/demodulation equipment connector 1. The power supply circuit 3 can be realized by, for example, a circuit which is called DC—DC converter. In the case where the terminal equipment connector 4 is a connector as shown in FIG. 2, a voltage of 5 V is supplied to the pin 38 of the modulation/demodulation equipment connector 1 by utilizing the voltage supply of 12 V to the pin 25 of the terminal equipment connector 4. That is, the power supply circuit 3 may convert the 12-V voltage supplied to the pin 25 of the terminal equipment connector 4 into the 5-V voltage which is supplied to the pin 38 of the modulation/demodulation equipment connector 1. As described above, since the power is supplied to the modulation/demodulation equipment 10 from the external thereof, it is unnecessary to provide a power supply circuit in the inside of the modulation/demodulation equipment 10. This is useful to reduce the size of the modulation/demodulation equipment 10. Especially when the modulation/demodulation equipment 10 is of a card type, the portability of the modulation/demodulation equipment cannot be lost.

EXAMPLE 2

Figure 4:
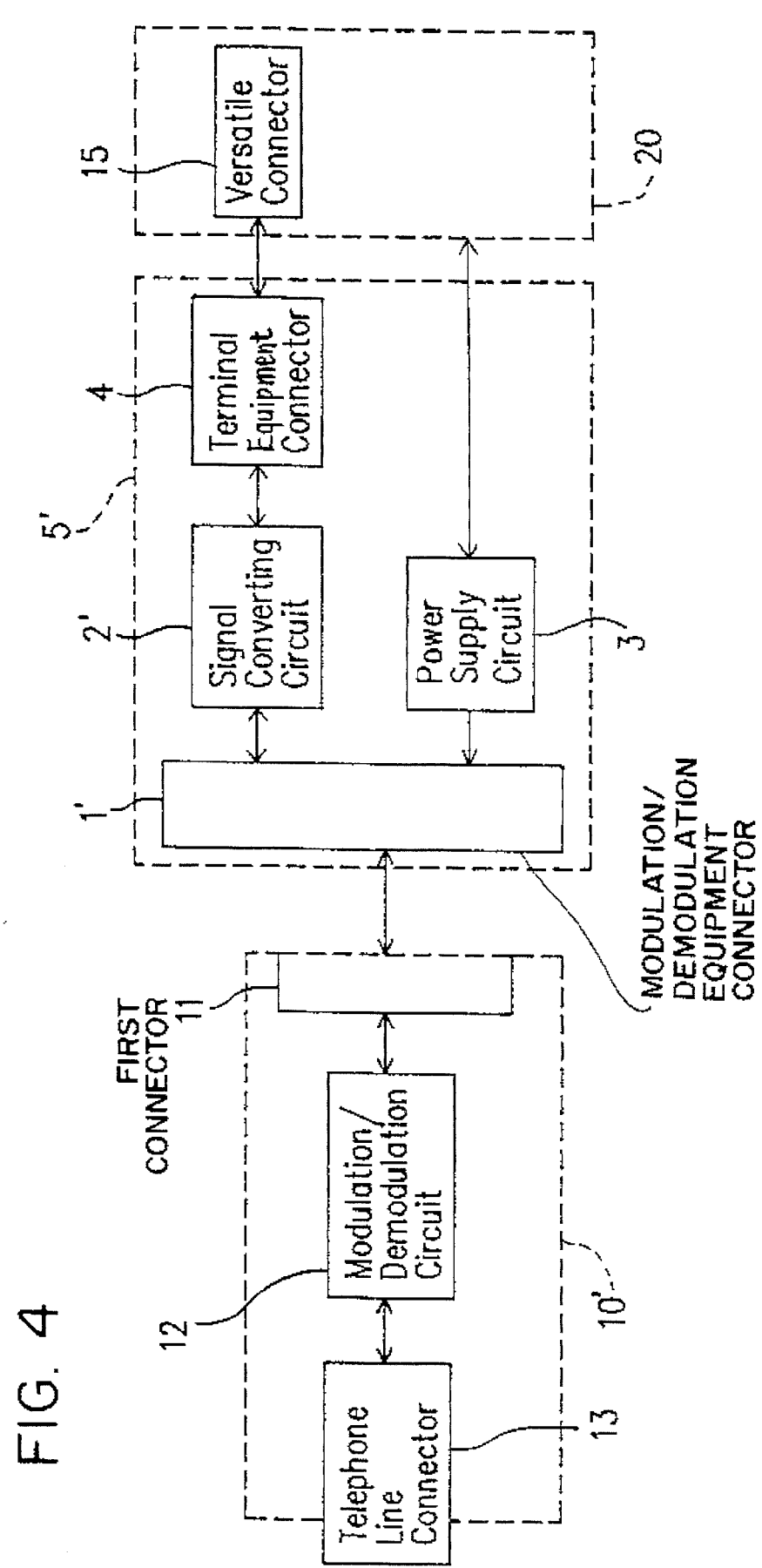
FIG. 4 is a diagram showing the structure of another converter according to the invention.

FIG. 4 shows the structure of another converter according to the invention together with a modulation/demodulation equipment and a terminal equipment which are connected to the converter. Components which are identical to those shown in FIG. 1 are indicated by like reference numerals, and the descriptions thereof are omitted.

The modulation/demodulation equipment 10' in FIG. 4 has the same configuration as that of the modulation/demodulation equipment 10 shown in FIG. 1 except that the second connector 14 is not provided in the modulation/demodulation equipment 10'. The modulation/demodulation equipment 10' is of a card type.

A converter 5' includes at least two connectors for the connections with external devices. One is a modulation/demodulation equipment connector 1' for the connection with the modulation/demodulation equipment 10'. Another is a terminal equipment connector 4 for the connection with the terminal equipment 20. The converter 5' further includes a signal converting circuit 2' and a power supply circuit 3. The signal converting circuit 2' is connected to the modulation/demodulation equipment connector 1' and the terminal equipment connector 4. In the signal converting circuit 2', a signal which is input from the modulation/demodulation equipment connector 1' is converted into a signal for the terminal equipment 20, and the converted signal is output to the terminal equipment connector 4. A signal which is input from the terminal equipment connector 4 is converted into a signal for the modulation/demodulation equipment 10', and the converted signal is output to the modulation/demodulation connector 1'. The power supply circuit 3 supplies power to the modulation/demodulation equipment 10' via the modulation/demodulation equipment connector 1'.

The modulation/demodulation equipment connector 1' meets the same standard as that for the first connector 11 of the modulation/demodulation equipment 10'. That is, the modulation/demodulation equipment connector 1' meets the JEIDA standard version 4.1 (PCMCIA release 2.0) which is the interface dedicated to a card-type equipment. The terminal equipment connector 4 meets the same standard as that for the versatile connector 15 of the terminal equipment 20. That is, the terminal equipment connector 4 meets the RS-232C standard. The modulation/demodulation equipment connector 1' is electrically connected to the first connector 11 of the modulation/demodulation equipment 10'. The terminal equipment connector 4 is electrically connected to the versatile connector 15 of the terminal equipment 20.

Figure 5:
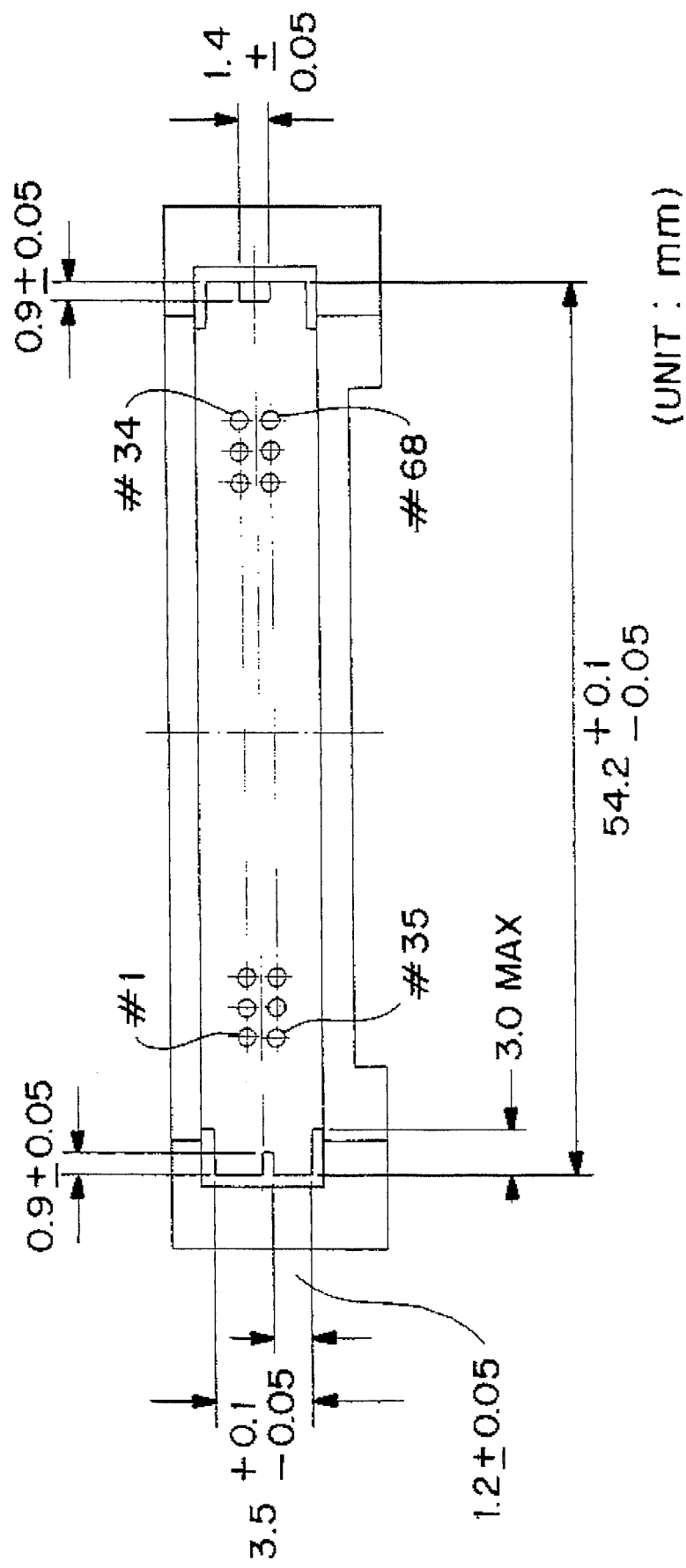
FIG. 5 is a view showing the shape and the pin arrangement of the connector which can be used as a modulation/demodulation equipment connector of the converter shown in FIG. 4.

FIG. 5 shows the shape and the pin arrangement of a connector which can be used as the modulation/demodulation equipment connector 1'. As is shown in FIG. 5, the connector includes 34 pins #1–#34 in the upper portion, and 34 pins #35–#68 in the lower portion, i.e., a total of 68 pins. In this specification, the pins in the upper portion (#1–#34) are referred to as pins 501–534, and the pins in the lower portion (#35–#68) are referred to as pins 535–568, respectively.

The pins 529–522, pins 512–511, pin 508, pin 510, pin 521, pins 513–514, pins 520–519, pins 546–550, and pins 553–556 are used to input signals indicative of address bits (A0–A25), respectively. These signals are collectively referred to as an address bus.

The pins 530–532, pins 502–506, pins 564–566, and pins 537–541 are used to input signals indicative of data bits (D0–D15), respectively. These signals are collectively referred to as a data bus.

The pin 561, pins 507 and 542, pin 545, pin 544, pin 560, pin 533, and pin 559 are used to input signals indicative of attribute memory space select (-REG), card enable (-CE), I/O write (-IOWR), I/O read (-IORD), input acknowledge (-INPACK), 16-bit I/O port (-IOIS16), and wait (-WAIT), respectively. These signals are collectively referred to as a control bus.

The pins 517 and 551 are respectively used to supply power (VCC), and the pins 501, 534, 535, and 568 are respectively used to ground (GND).

Figure 6:
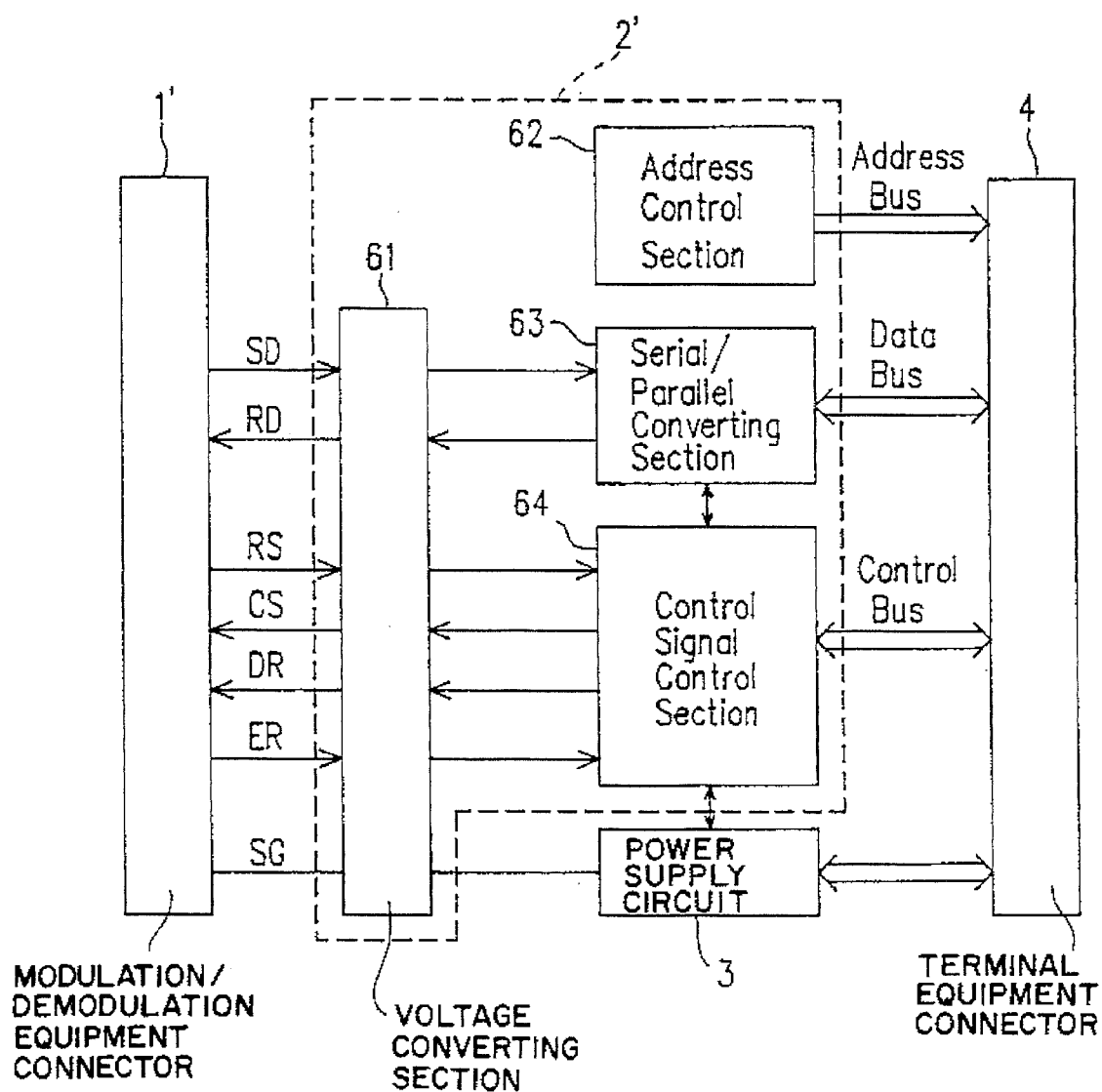
FIG. 6 is a diagram showing an exemplary structure of the signal converting circuit shown in FIG. 4.

FIG. 6 shows the structure of the signal converting circuit 2'. The signal converting circuit 2' includes a voltage converting section 61, an address control section 62, a serial/parallel converting section 63, and a control signal control section 64. Referring to FIG. 6, the operation of the signal converting circuit 2' is described. The voltage converting section 61 converts the voltage level. Such conversion of the voltage signal can be realized by a driver/receiver IC for the RS-232C. For example, as the signal converting circuit 2', "SN75188" which is commercially available from TEXAS INSTRUMENTS LTD. can be used.

The address control section 62 determines values of the address bus (A0–A25).

The serial/parallel converting section 63 converts the signal transmission system. That is, a serial signal indicative of send data (SD) which is input from the terminal equipment connector 4 is converted into a parallel signal. The converted signal is output to the modulation/demodulation equipment connector 1' as the data bus. A parallel signal which is input from the modulation/demodulation equipment connector 1' as the data bus is converted into a serial signal. The converted signal is output to the terminal equipment connector 4 as receive data (RD). Such serial/parallel conversion can be realized by an element which is called UART (Universal Asynchronous Receiver Transmitter). For example, for the serial/parallel converting section 63, "IM6402" which is a CMOS-LSI and commercially available from INTERSIL INC.

The control signal control section 64 controls the timing for inputting/outputting a serial signal and a parallel signal. The control signal control section 64 converts the signals indicative of request-to-send (RS), clear-to-send (CS), data-set-ready (DR), and data-terminal-ready (ER) at the terminal equipment connector 4, to the signals indicative of attribute memory space select (-REG), card enable (-CE), I/O write (-IOWR), I/O read (-IORD), input acknowledge (-INPACK), 16-bit I/O port (-IOIS16), and wait (-WAIT) at the modulation/demodulation equipment connector 1', and vice versa.

The power supply circuit 3 supplies power to the modulation/demodulation equipment 10' via the modulation/demodulation equipment connector 1'. More specifically, in a case where the modulation/demodulation equipment connector 1' is a connector as shown in FIG. 5, a voltage of 5 V is supplied to the pins 517 and 551 of the modulation/demodulation equipment connector 1'. The power supply circuit 3 can be realized by, for example, a circuit which is called DC—DC converter. Alternatively, in the case where the terminal equipment connector 4 is a connector as shown in FIG. 2, a voltage of 5 V is supplied to the pins 517 and 551 of the modulation/demodulation equipment connector 1' by utilizing the voltage supply of 12 V to the pin 25 of the terminal equipment connector 4. That is, the power supply circuit 3 may convert the 12-V voltage supplied to the pin 25 of the terminal equipment connector 4 into the 5-V voltage which is supplied to the pins 517 and 551 of the modulation/demodulation equipment connector 1'. As described above, since the power is supplied to the modulation/demodulation equipment 10' externally, it is unnecessary to provide a power supply circuit in the inside of the modulation/demodulation equipment 10'. This is convenient for reducing the size of the modulation/demodulation equipment 10'. Especially when the modulation/demodulation equipment 10' is of a card type, the portability of the modulation/demodulation equipment cannot be lost.

The present invention is not limited to a specific interface. For example, instead of the protocol based on the rules of the above-mentioned interface, a protocol with upper compatibility with the rules may be used, and instead of the above-mentioned connector, a connector with upper compatibility with the above-mentioned connector may be used, within the scope of this invention. In a case where the versatile connector 15 of the terminal equipment 20 is a connector based on the bus interface, a connector based on the bus interface can be adopted as the terminal equipment connector 4 of the converter 5 or 5', instead of the connector under the RS-232C standard.

In addition, in the above examples, the card-type modulation/demodulation equipment has been described as an example. However, the modulation/demodulation devices 10 and 10' are not limited to a card-type modulation/demodulation equipment. The present invention is applicable to any type of modulation/demodulation equipment having an interface different from the versatile interface of the terminal equipment, and having no space for providing a power supply.

Moreover, in the above examples, the terminal equipment 20 may be a personal computer. However, the present invention is applicable to any terminal equipment other than a personal computer.

According to this invention, a modulation/demodulation equipment and a terminal equipment which have different interfaces can be connected to each other. Specifically, a card-type modulation/demodulation equipment having an interface dedicated to a card-type equipment can be connected to a terminal equipment having a versatile interface. Therefore, there is no loss of portability in the card-type modulation/demodulation equipment. Thus, the card-type modulation/demodulation equipment can be widely used together with a terminal equipment which is conventionally used.

Various other modifications will be apparent and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A converter which is connected to modulation/demodulation equipment having a first interface and to terminal equipment having a second interface, the converter comprising:

first connection means for electrically connecting the converter to said modulation/demodulation equipment;

second connection means for electrically connecting the converter to said terminal equipment;

signal conversion means, connected to said first connection means and said second connection means, for converting a first signal input from said first connection means into a first converted signal which is compatible with said second interface and outputting said first converted signal to said second connection means and for converting a second signal input from said second connection means into a second converted signal which is compatible with said first interface and outputting said second converted signal to said first connection means; and power supply means for supplying power to said modulation/demodulation equipment via said first connection means.

2. The converter according to claim 1, wherein said first interface is an interface dedicated to card-type equipment.

3. The converter according to claim 2, wherein said first interface is based on the Japan Electronic Industry Development Association standard.

4. The converter according to claim 1, wherein said first interface is based on the RS-232C standard regarding electrical connection and timing for inputting/outputting a signal and is not based on the RS-232C standard regarding physical connector shape and range of operating voltage.

5. The converter according to claim 1, wherein said second interface is based on the RS-232C standard.

6. The converter according to claim 1, wherein said converter receives a power signal from an external source.

7. The converter according to claim 6, where said external source is said terminal equipment.

8. The converter according to claim 6, wherein said converter receives said power signal via said second connection means.

9. The converter according to claim 1, wherein said power supply means includes a DC—DC converter.

10. The converter according to claim 1, wherein said power supply means is a self-contained power source housed on the converter, said self-contained power source producing a voltage signal and supplying the voltage signal to said modulation/demodulation equipment via said first connection means.

11. The converter according to claim 1, wherein said power supply means produces a voltage signal and supplies the voltage signal to said modulation/demodulation equipment via said first connection means.

* * * * *